United States Patent [19]

Vajda et al.

[11] Patent Number: 4,837,042

[45] Date of Patent: Jun. 6, 1989

[54] FRUIT-CONTAINING CHOCOLATE PRODUCTS AND PROCESS OF THEIR PREPARATION

[75] Inventors: Gabor Vajda; Laszlo Ravasz; Gaborne Vajda; Bela Karacsonyi, all of Budapest, Hungary

[73] Assignee: Agro-Industria Innovacios Vallalat, Budapest, Hungary

[21] Appl. No.: 77,074

[22] Filed: Jul. 24, 1987

Related U.S. Application Data

[63] Continuation-in-part of Ser. No. 767,282 filed as PCT HU84/00065 on Dec. 20, 1984, published as WO85/02757 on Jul. 4, 1985, abandoned.

[30] Foreign Application Priority Data

Dec. 20, 1983 [HU] Hungary ............................... 4346/83

[51] Int. Cl.$^4$ ............................................. A23G 1/00
[52] U.S. Cl. ..................................... 426/615; 426/660; 426/102; 426/639; 426/613; 426/659
[58] Field of Search ............... 426/660, 102, 639, 613, 426/659

[56] References Cited

U.S. PATENT DOCUMENTS

| | | | |
|---|---|---|---|
| 1,044,758 | 11/1912 | Dierbach | 426/660 |
| 1,255,638 | 2/1918 | Reed | 426/660 |
| 1,686,785 | 10/1928 | Zeller | 426/102 |
| 1,686,786 | 10/1928 | Zeller | 426/102 |
| 2,442,928 | 6/1948 | Mac Master et al. | 426/660 |
| 3,554,766 | 1/1971 | Engel et al. | 426/660 |
| 3,705,814 | 12/1972 | Roshman et al. | 426/102 |
| 4,289,790 | 9/1981 | Bruelle | 426/660 |
| 4,307,126 | 12/1981 | Sano et al. | 426/660 |

FOREIGN PATENT DOCUMENTS

| | | |
|---|---|---|
| 68844 | 5/1915 | Austria . |
| 458179 | 10/1913 | France . |
| 2065442 | 7/1981 | United Kingdom . |

*Primary Examiner*—Jeanette Hunter
*Attorney, Agent, or Firm*—Schweitzer & Cornman

[57] ABSTRACT

The invention relates to the preparation of mouldable or smearable fruit-containing chocolate products. According to the invention one part by mass of chocolate optionally containing an emulsifier is melted at 32° to 40° C., the melt is homogenized with 0.5 to 1.0 parts by mass of a fruit concentrate containing at least 8% by mass of fruit dry substance, which has previously been admixed with sugar or any other carbonhydrate and 0.2 to 8.0% by mass of a lyophilic additive, and concentrated to 62 to 68 Ref%, and the homogeneous mixture is filled into moulds, containers or used for coating corpora. The pH of the fruit employed is adjusted to 5.0 to 6.8. To obtain a creamy consistence vegetable fats are added to the chocolate. As a lyophilic additive for example sodium alginate, carrageen, soluble starch, carboxymethyl starch, carboxymethyl cellulose, casein, agar-agar and sodium citrate or mixtures thereof can be used.

22 Claims, No Drawings

FRUIT-CONTAINING CHOCOLATE PRODUCTS AND PROCESS OF THEIR PREPARATION

This is a continuation-in-part of co-pending application Ser. No. 767,282 filed as PCT HU84/00065 on Dec. 20, 1984, published as WO85/02757 on Jul. 4, 1985, now abandoned.

The invention relates to fruit-containing chocolate products and a process for their preparation. More particularly, the invention concerns fruit-containing chocolate products which are mouldable or smearable. In this connection, the term "smearable" is a physical state of the chocolate product which is paste-like such that it can easily be applied, by spreading, smearing, etc. onto an edible substrate, for example, crackers, bread, etc. or the product can be consumed by itself, by spoon, for example. Also, the smearable product of the present invention can be used to fill pastry in much the same way that presently available chocolate products are used, which, however, do not contain fruit.

In spite of the rapidly growing assortment of confectionery, goods chocolate or chocolate-containing products are still the most popular sweets, particularly as slab-chocolate, solid chocolate figures or dipping masses for use in confectioneries, in biscuit and wafer manufacture and in the baking industry and catering trade. The latter ones as coatings or various decorations make the products cakes, biscuits, etc. more attractive and more delicious. The creamy chocolate articles smearable at room temperature are also much in demand.

The basic material of chocolate is the cocoa mass prepared from cocoa bean by roasting, husking, reduction in size and refinement. The most important components of cocoa mass are cocoa butter and cocoa dry substance. Cocoa butter is the fatty component of cocoa, while the dry substance includes the protein, carbohydrate and alkaloid pigment and mineral components of cocoa. From the cocoa mass, chocolate is prepared by adding sugar. The character of chocolate is determined by the ratio of cocoa butter, cocoa dry substance and sugar.

The dipping chocolate, also known by its well-known German name "Tunkmasse" is prepared for further processing and contains 44% by weight, the bitter chocolate 30 to 43% by weight, the sweet chocolate 50 to 55% by mass and the usual "household" chocolate 66% by mass of sugar.

Chocolate is frequently enriched with various additives, partially to make it cheaper, partially to widen the assortment of chocolate products. Chocolates prepared with milk dry substance are called milk chocolate, while by using oil-seed-like additives, moulded by lamination, homogenization almond-, whole nut, etc. chocolates are obtained.

One of the main features of chocolate is its homogenity, which is preserved after proper melting and resolidification. Therefore, slabs, figures, etc. can be prepared from chocolate by moulding. Chocolate is further suitable for coating various corpura. In this connection, the term "corpura" refers to any solid-type edible article, for example, whole strawberries, banana sections, cherries, raisins, even ants.

With respect to the chocolates flavoured with lumpy additives nut, almond, peanut, plum, etc. there can be prepared slabs or smaller solid chocolate figures, they are no longer suitable for coating corpora or different cakes.

Chocolate enriched with a higher proportion of oily seeds or vegetable fats is plastic at room temperature. Such products are used as filling or are sold for direct consumption in smaller portion, for example in glasses.

Fruit and fruit products dried fruit, candied fruit, etc. has, in the past only been used in chocolate manufacture as lumpy additives only. Fruit juice, pulp, marmalade and jam have been employed as fillings by preparing a dessert tube, which is then filled with the fruit mass and coated with chocolate. Chocolate is basically lyophobic, it cannot take up more water than 2 to 3% by weight. It can be proved experimentally that chocolate mass is no longer homogeneous if more than 5% by weight of water is added. As a result of higher water-content, the water present in chocolate is dissolved, and the saturated sugar syrup cannot be dispersed in the dispersion medium of chocolate, in the cocoa butter. Therefore, if an additive of higher water content e.g. fruit concentrate is added to the originally homogeneous, melted cocoa mass or "Tunkmasse", water and fat balls are formed, the mass becomes knotty, and becomes unsuitable for dipping or moulding. It can be seen that with lyophilic additives containing more than 3 to 5% by weight of water, a homogeneous chocolate mass could not be prepared. The water content of chocolate cannot be increased above 5% by weight even if the amount of emulsifying additives is increased. Therefore fruit has, in the past, only been added in a dried form as pulp or as candied fruit or in lumpy state almond, nut to the liquid chocolate mass, which is then moulded or shaped into slabs by known technology. Using fruit pulp or other fruit concentrates no homogeneous chocolate-containing desserts could be prepared since fruit-containing basic materials, due to their high water-content, made the chocolate knotty, the originally homogeneous chocolate lost its smoothness, small clumps were formed and the product became unsuitable for consumption.

Our intention was to develop a technique by which homogeneous chocolate-containing products can be prepared with fruit additives, which preserve their smoothness, mouldability and are pleasant to the taste. The chocolate mass prepared according to the invention can be manufactured as solid slabs or is suitable for coating various corpora or cakes. They can further be marketed as smearable products for fillings or direct consumption.

According to the invention, one part by weight of chocolate, optionally containing an emulsifying additive, is melted at 32° to 40° C. and the melt is homogenized with 0.5 to 1.0 part by weight of a fruit concentrate containing at least 8% by weight of fruit dry substance, which has previously been admixed with sugar or any other, material as carbohydrate which acts as a sugar, and 2.0 to 8.0% by weight of a lyophilic additive. The material is then concentrated to 62 to 68% Ref., and the homogeneous mixture is filled into moulds or used for coating corpora. In this respect, it should be appreciated that the use herein of the term "Ref." means the refractometer percent which denotes the concentration of the solids in a juice. For example, 68% Ref means that the solid content of the juice is about 68% by weight. The pH of the fruit concentrate employed is adjusted to 5.2 to 6.8 with citric acid, tartaric acid or any other acid suitable for human consumption. As an emulsifier, for example, mono or diglycerides, and sorbitan fatty acid esters, can be used. The chocolate component can be either eating chocolate or milk chocolate, cocoa mass or confectionery mass. Confectionery mass is a coating mass similar to dipping chocolate, which consists of cocoa powder, sugar and vegetable fats. To obtain a creamy consistency 7 to 15% of vegetable fats are added to the melted chocolate related to its weight. Stabilizers of lyophilic character are substances which can bind water in an amount corresponding to multiples of their weight in the form of a gel. If such substances are added to liquid or plastic materials containing a high amount of water e.g. sugar solution, fruit pulp, they bind the free water-content of these materials and make them solid. Such substances include, for example, sodium alginate, carrageen, soluble starch, carboxymethyl starch, carboxymethyl cellulose, agar, gelatine, casein and sodium citrate and mixtures of these materials. The term "fruit concentrate" refers to a concentrate prepared from fruits fruit juice, fruit pulp and sugar by concentration preferably in vacuum up to a 62 to 68% Ref. water-soluble dry substance content, which contains at least 5% of original fruit dry substance. The sugar content of fruit concentrates is at least 40 to 200% by weight. The stabilized fruit concentrates have essentially the same composition, except that 2 to 8% of their sugar content is replaced by an additive of lyophilic character.

According to another aspect of the invention there are provided fruit-containing, mouldable and smearable chocolate products comprising 1 part by weight of chocolate and 0.5 to 1.0 parts by weight of a fruit concentrate containing at least 8% by weight of fruit dry substance related to its weight, 2.0 to 8.0% by weight of lyophilic additive and concentrated up to 62 to 68% Ref.

According to a preferred embodiment of the process according to the invention, 0.8 to 1.2 parts by weight of stabilized fruit concentrate having 62 to 68% Ref. dry substance content 0.2% by weight of emulsifier are mixed, the mixture is heated up to 70° to 90° C. and homogenized, after left standing it is cooled to 25° to 35° C. and homogenized with 0.2 to 0.6 parts by weight of melted fats at the same temperature, heated up to 40° C., 0.8 to 1.2 parts by weight of melted chocolate are admixed, the mixture is homogenized and solidified with cooling.

The invention is based on the recognition that the stability of foodstuffs having an "oil-in-water" emulsion structure is substantially influenced by their so called free water concentration. It is known that the quantity of water dispersed in the fat-containing oily dispersion medium cannot exceed a strict limit: 3.5 to 5.0% by weight. The proportion of water present in the fatty dispersion medium can, however, be increased by adding a portion of water into the emulsion system as bound water, i.e. water bound with a lyophilic additive. Under such conditions in a given pH-range, water can be dispersed in the system without altering its stability, in other words, in the lyophobic medium more water can be dispersed. The water-content of the fruit mass added to the chocolate according to the invention can be bound by a stabilizing substance, from which water is not released under heating up to 60° C. and solidification, even if the heating and solidifying cycles are repeated and the melted homogeneous mixture is stirred. In the fruit mass the proportion of the free water related to the weight of the free and bound water total water content cannot exceed 10% by weight. In this manner by admixing the fruit mass having a relatively high water-content with chocolate homogeneously a new product is obtained. The pH of the fruit mass also plays an important role. The pH should be between 5.2 and 6.8 during admixture. The water-binding capacity of the employed stabilizers is namely influenced by the pH; in a neutral or slightly alkaline medium the stability is worsening.

A substantial advantage of the process according to the invention is that the consistency of the chocolate mass at room temperature can be regulated by the ratio of the the admixed fruit and chocolate without risking the stability of the mass. If, for example, instead of sweet eating chocolate, a confectionery mass containing vegetable fats is employed, the product becomes softer, creamy, which can be directly eaten with a spoon or can be used as a filling. The same result can be obtained by increasing the proportion of the fruit mass during the preparation of the product.

The main advantages of the process according to the invention can be summed up as follows:

A new product with a new composition and taste is obtained from chocolate and fruit components, which is homogeneous, mouldable and can be used either for the preparation of finished products or for coating cakes and corpora. In this manner the monotony of chocolate fillings and additives is minimized, and instead of expensive oily seeds, fruits, too, can be used as chocolate components. By the process according to the invention a wide variety of various products can be prepared, and fruits can be used in a higher proportion in the manufacture of chocolate products.

The invention will now be illustrated in greater detail in the following specific Examples, which are given for illustration and not limitation of our invention.

EXAMPLE 1

Preparation of raspberry-chocolate 100 g of raspberry pulp are concentrated to half of its weight in vacuum, 50 g of powdered sugar previously admixed with 5 g of a lyophilic additive namely sodium alginate are added, and the mixture is concentrated to 66 to 68% Ref. of dry substance. Care must be taken that the temperature should be in a range where the pigments and flavouring agents are not deteriorated. The alteration of pigments necessarily means the deterioration of aroma substances of fruits. In the meantime 150 g of semi-bitter chocolate are melted on water bath in a double walled cooking vessel with jacket heating and 0.2 g of an emulsifier are added. The temperature of the melted chocolate should not exceed 45° C. Thereafter, the fruit substance having about the same temperature is added and thoroughly homogenized. The mixture is then filled into moulds under stirring, at a temperature of 40° C. and solidified or used for dipping.

EXAMPLE 2

Preparation of strawberry-chocolate 100 g of a stabilized strawberry concentrate having a dry substance content of 66 to 68% Ref. are heated under careful stirring, and its pH is adjusted to 6.4 with citric acid. In the meantime 150 g of milk chocolate are melted as described in Example 1, 0.2 g of an emulsifier are added, and then the mixture is admixed with the fruit concentrate at 40° C. and a homogeneous mass is prepared. The mass is then filled into moulds and solidified. Alternatively, the mass is filled into containers suitable for foodstuff storage enamelled metal boxes, synthetic boxes etc., which are then sealed.

EXAMPLE 3

Preparation of black-currant chocolate 120 g of black-currant pulp are concentrated to half of its weight in vacuum. 52 g of sugar previously admixed with 8 g of lyophilic additive namely carboxymethyl cellulose are added and the mixture is concentrated to 67% Ref. In the meantime in a melting vessel equipped with a jacket heater 150 g of confectionery mass containing vegetable fats are melted. Thereafter the fruit mass concentrated and cooled up to 45° C. is added, and the mixture is thoroughly homogenzied. Furtheron the procedure described in Example 1 is followed.

EXAMPLE 4

Preparation of diabetic fruit-chocolate 200 g of peach pulp are concentrated to half of its weight under stirring, in vacuum. To the concentrate 80 g of fructose previously admixed with 6 g of lyophilic additive carboxymethyl starch and concentrated to 68% Ref., the pH of which has been adjusted to 6.3, are added. Thereafter 150 g of cocoa mass are melted, 0.2 g of emulsifier are added, followed by the addition of the fruit concentrate cooled to 45° C. After homogenization the procedure described in Example 1 is followed. If sorbite is employed, the desired sweetness is adjusted with a synthetic sweetener, such as saccharine, cyclamate, xylose, etc.

EXAMPLE 5

Preparation of fruit-cream 100 g of a stabilized mixed fruit concentrate including as lyophilic additive a 1:1 mixture of gelatine and agar Ref.%=67 are heated up to 40° C. under stirring, and homogenized with 150 g melted semi-bitter chocolate of 40° C. The cream is then filled into cups, which are sealed. The flavour of fruit-creams is intensified by adding synthetic flavouring agents.

EXAMPLE 6

Preparation of fruit-cream 100 g of a mixed fruit concentrate Ref.%=65-68 are heated up to 40° C. It is flavoured with several drops of synthetic aroma material and 5 g of lyophilic additive are added as a stabilizer. To 150 g of melted chocolate 0.2 g of emulsifier and 10 g of vegetable fat are added in a separate vessel. The fruit concentrate is added to the homogenized chocolate mass at 40° C., and after homogenization the cream is filled into boxes and solidified.

EXAMPLE 7

Preparation of a fruit-containing slab

Into 100 g. fruit concentrate of 63 to 68 Ref.% (i.e. 100 g concentrate contains 63 to 68% sugar) 6 g of a lyophilic additive namely carrageen and 0.2 g of an emulsifier are added. The mixture is heated up to 70° to 90° C., homogenized and cooled to 30° C. 15 g of cocoa butter or another vegetable fat having the same rheological properties as that of cocoa butter melting point: 28° to 32° C., solidification point: 24° C. are melted, heated to the same temperature as the fruit concentrate and homogenized with the fruit concentrate. After homogenization the temperature of the mixture is slowly raised up to 40° C. and at this temperature 100 g of previously melted chocolate are added. The mixture is then filled into moulds and solidified by cooling.

What is claimed is:

1. A process for the preparation of substantially homogeneous fruit-containing chocolate products, comprising the steps of:
   (a) melting one part, by weight, of a chocolate component at a temperature of between about 32° to 40° C. to produce a chocolate containing melt, and
   (b) adding to said melt 0.5 to 1.0 parts, by weight, of a fruit concentrate, having a temperature of about 32° to 40° C.; said concentrate containing at least 8%, by weight, of fruit dry substance, sweetener and between about 2.0–8.0%, by weight, of a lyophilic additive, said concentrate having a dry substance content of between about 62 to 68 Refractometer percent.

2. A process as claimed in claim 1 wherein said chocolate component also contains an emulsifying agent.

3. A process as claimed in claim 2 wherein said emulsifying agent is selected from the group consisting of mono or diglycerides; and sorbitan fatty acid esters.

4. A process as claimed in claim 1, wherein said sweetener is selected from the group consisting of fructose, sucrose, sorbite, cyclamate, xylose, glucose and saccharine.

5. A process as claimed in claim 1, wherein said fruit concentrate contains sugar in the range of about 40–200%, by weight.

6. A process as claimed in claim 1, further comprising the step of adjusting the pH of said fruit concentrate to between about 5.2 to 6.8.

7. A process as claimed in claim 1, wherein said chocolate component is selected from the group consisting of milk chocolate, semi-sweet chocolate, cocoa mass and confectionery mass.

8. A process as claimed in claim 1, wherein 7 to 60%, by weight, of vegetable fats, related to the weight of said melt, are added to said chocolate component to form a chocolate fruit-flavored fat product.

9. A process as claimed in claim 1, wherein said lyophilic additive is selected from the group consisting of sodium alginate, carrageenin, soluble starch, carboxymethyl starch, casein, sodium citrate, carboxymethyl cellulose, agar-agar, gelatin and mixtures thereof.

10. A process as claimed in claim 1, further comprising the step of adding to 0.8 to 1.2 parts, by weight, of said fruit concentrate, concentrated to between about 62 to 68% Refractometer percent, 0.2%, by weight, of an emulsifier.

11. A process as claimed in claim 10, further comprising the steps of homogenizing said fruit concentrate by heating it to a temperature in the range of about 70° to 90° C., allowing it to stand, cooling it to a temperature in the range of about 25° to 35° C.; homogenizing 0.2 to 0.6 parts, by weight, of a melted fat at a temperature of about 25° to 35° C., heating the same to about 40° C. and mixing with 0.8 to 1.2 parts, by weight, of said melt, followed by homogenization with said fruit concentrate and subsequent cooling until solidification.

12. A substantially homogenous fruit containing chocolate product made according to the process of claim 1.

13. A substantially homogenous fruit containing chocolate product comprising:
   (a) 1 part, by weight, of a chocolate component;
   (b) 0.5 to 1.0 part, by weight, of a fruit concentrate containing at least 8%, by weight, of fruit dry substance related to its weight and 2.0 to 8.0%, by weight of a lyophilic additive, said fruit concentrate being between about 62 to 68% Refractometer.

14. A product as claimed in claim 13 further comprising:
   (a) said chocolate component also contains an emulsifying agent.

15. A product as claimed in claim 14 wherein said emulsifying agent is selected from the group consisting of mono or diglycerides, and sorbitan fatty acid esters.

16. A product as claimed in claim 13 wherein said fruit concentrate also includes a sweetener.

17. A product as claimed in claim 16 wherein said sweetener is selected from the group consisting of fructose, xylose, cyclamate, sorbite, glucose and saccharine.

18. A product as claimed in claim 13, wherein said fruit concentrate has an adjusted pH in the range of about 5.2 to 6.8.

19. A product as claimed in claim 13 wherein said chocolate component is selected from the group consisting of milk chocolate, semi-sweet chocolate, cocoa mass, and confectionery mass.

20. A product as claimed in claim 13 wherein said chocolate component also includes about 7 to 60%, by weight of vegetable fat.

21. A product as claimed in claim 13 wherein said lyophilic additive is selected from the group consisting of sodium alginate, carrageenin, soluble starch, carboxymethyl starch, casein, sodium citrate, carboxymethyl cellulose, agar-agar, gelatin, and mixtures thereof.

22. A product as claimed in claim 13 wherein about 0.2%, by weight, of an emulsifier is added to about 0.8 to 1.2 parts, by weight, of said fruit concentrate.

* * * * *